US012573978B2

(12) United States Patent
Schuknecht et al.

(10) Patent No.: US 12,573,978 B2
(45) Date of Patent: Mar. 10, 2026

(54) MOUNTING RAILS

(71) Applicant: Array Technologies, Inc., Albuquerque, NM (US)

(72) Inventors: Nathan Schuknecht, Golden, CO (US); Nikhil Kumar, Albuquerque, NM (US)

(73) Assignee: ARRAY TECH, INC., Albuquerque, NM (US)

( * ) Notice: Subject to any disclaimer, the term of this patent is extended or adjusted under 35 U.S.C. 154(b) by 322 days.

(21) Appl. No.: 18/349,890

(22) Filed: Jul. 10, 2023

(65) Prior Publication Data

US 2025/0023508 A1 Jan. 16, 2025

(51) Int. Cl.
*H02S 20/30* (2014.01)
*H02S 20/20* (2014.01)

(52) U.S. Cl.
CPC ............. *H02S 20/30* (2014.12); *H02S 20/20* (2014.12)

(58) Field of Classification Search
CPC ........... H02S 20/32; H02S 30/10; F24S 25/63
USPC ........................................................ 52/173.3
See application file for complete search history.

(56) References Cited

U.S. PATENT DOCUMENTS

| | | | | |
|---|---|---|---|---|
| 10,069,455 | B2 * | 9/2018 | Corio | F24S 25/634 |
| 10,536,109 | B2 * | 1/2020 | Corio | F24S 30/425 |
| 12,031,750 | B2 * | 7/2024 | Schuknecht | F16B 2/065 |
| 2014/0246549 | A1 * | 9/2014 | West | H02S 20/23 |
| | | | | 248/220.22 |
| 2015/0200621 | A1 * | 7/2015 | Reed | F24S 25/636 |
| | | | | 29/525.01 |
| 2019/0049151 | A1 | 2/2019 | Harris | |
| 2020/0153382 | A1 * | 5/2020 | Ballentine | F24S 25/636 |
| 2020/0162016 | A1 * | 5/2020 | Corio | F24S 30/425 |
| 2021/0359640 | A1 * | 11/2021 | Schuknecht | H02S 20/30 |
| 2022/0224284 | A1 * | 7/2022 | Zimmermann | H02S 20/30 |
| 2022/0255494 | A1 | 8/2022 | Wildes | |
| 2022/0271706 | A1 * | 8/2022 | Creasy | H02S 30/10 |
| 2022/0271707 | A1 * | 8/2022 | Reynolds | H02S 30/10 |
| 2022/0407451 | A1 | 12/2022 | Jacobs | |
| 2023/0402960 | A1 * | 12/2023 | Taha | F24S 25/63 |

FOREIGN PATENT DOCUMENTS

CA 3161538 A1 6/2021

OTHER PUBLICATIONS

European Patent Office; International Search Report and Written Opinion issued in Int'l App. No. PCT/US2024/037055 dated Nov. 13, 2024; 13 pages.

* cited by examiner

*Primary Examiner* — Beth A Stephan
(74) *Attorney, Agent, or Firm* — MASCHOFF BRENNAN

(57) ABSTRACT

A mounting rail configured to connect to a photovoltaic (PV) module may include an upper portion, a first alignment member, and a second alignment member. The upper portion may include a surface configured to physically engage with a bottom surface of a module rail associated with the PV module. The first alignment member may extend from the surface of the upper portion at a first location. The first alignment member may also be configured to physically engage with a side surface of the module rail. The second alignment member may extend from the surface of the upper portion at a second location. The second alignment member may also be configured to physically engage with the side surface of the module rail.

18 Claims, 11 Drawing Sheets

MOUNTING RAILS

FIELD

The embodiments discussed in the present disclosure are related to solar installations and, more particularly, to mounting rails for use in a solar installation.

BACKGROUND

Solar installations including solar farms, photovoltaic (PV) plants, solar tracking systems, fixed solar systems, and other PV systems include large numbers of PV modules that collect sunlight and generate energy. During installation, the PV modules are aligned relative to and coupled to mounting rails to position the PV modules within the solar installations. Aligning the PV modules relative to the mounting rails is difficult and time consuming, because the PV modules can be heavy and cumbersome to move, and misalignment is common.

Misalignment of the PV modules may cause adjacent PV modules to contact each other, which can damage or shorten a life span of the PV modules. Consequently, misalignment of the PV modules may increase a cost of operating solar installations. Accordingly, there is a need for an improved system for installing solar installations, in particular, aligning and maintaining alignment of the PV modules relative to the mounting rails.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used to limit the scope of the claimed subject matter.

Exemplary embodiments of the present disclosure address the problems experienced in solar installations, including problems associated with aligning and maintaining alignment of the PV modules relative to the mounting rails. Disclosed embodiments provide a mounting rail that includes one or more alignment members that physically engage with side surfaces of the PV modules to align the PV modules relative to the mounting rail. In addition, the mounting rail may include retention members that physically engage with the side surfaces of the PV modules to prevent the PV modules from moving along a lateral axis of the mounting rail and falling off the mounting rail.

The alignment members maintain the alignment of the PV modules relative to the mounting rails without the need to visually align the PV modules or attempt to align the PV modules through trial and error, which simplifies the installation process. In addition, the retention members prevent the PV modules from moving along the lateral axis and falling off the upper portion, which also simplifies the installation process. Hence, the alignment members and the retention members increase installation efficiency and thereby reduce costs associated with the installation process. The alignment members also prevent the PV modules from contacting adjacent PV modules, which can increase the life span of the PV modules and thereby reduce costs associated with operation of the solar tracking system.

The object and advantages of the embodiments will be realized and achieved at least by the elements, features, and combinations particularly pointed out in the claims. Both the foregoing summary and the following detailed description are exemplary and explanatory and are not restrictive.

BRIEF DESCRIPTION OF THE DRAWINGS

Example embodiments will be described and explained with additional specificity and detail through the use of the accompanying drawings in which.

all according to at least one embodiment described in the present disclosure.

DETAILED DESCRIPTION

Embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise. Although illustrated and described in relation to the solar tracking system 100, it is appreciated that the embodiments described in the present disclosure may be implemented in a solar tracking system, a fixed solar system, or any other appropriate solar system.

Figure 1A:
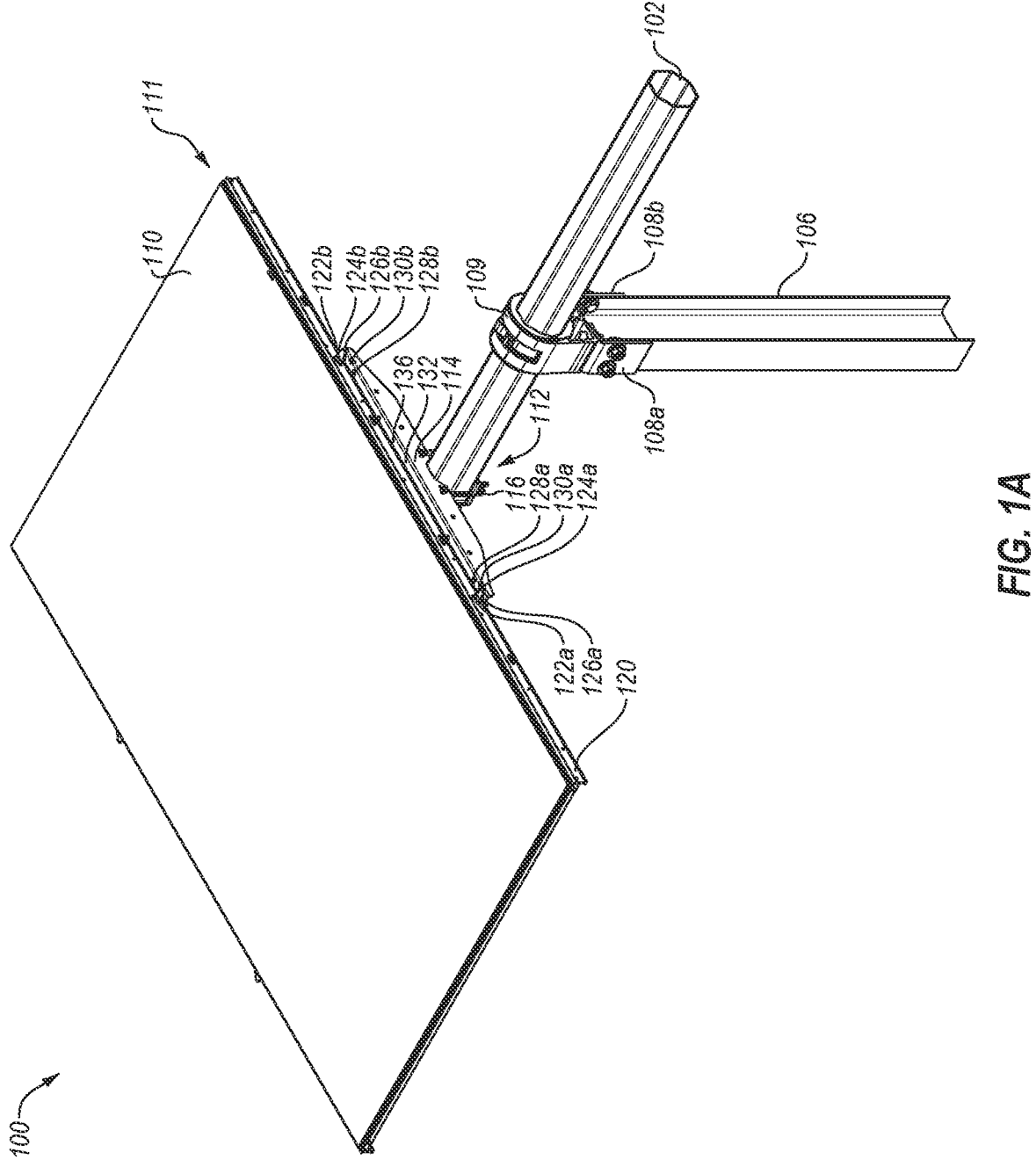
FIG. 1A illustrates an example solar tracking system.
Figure 1B:
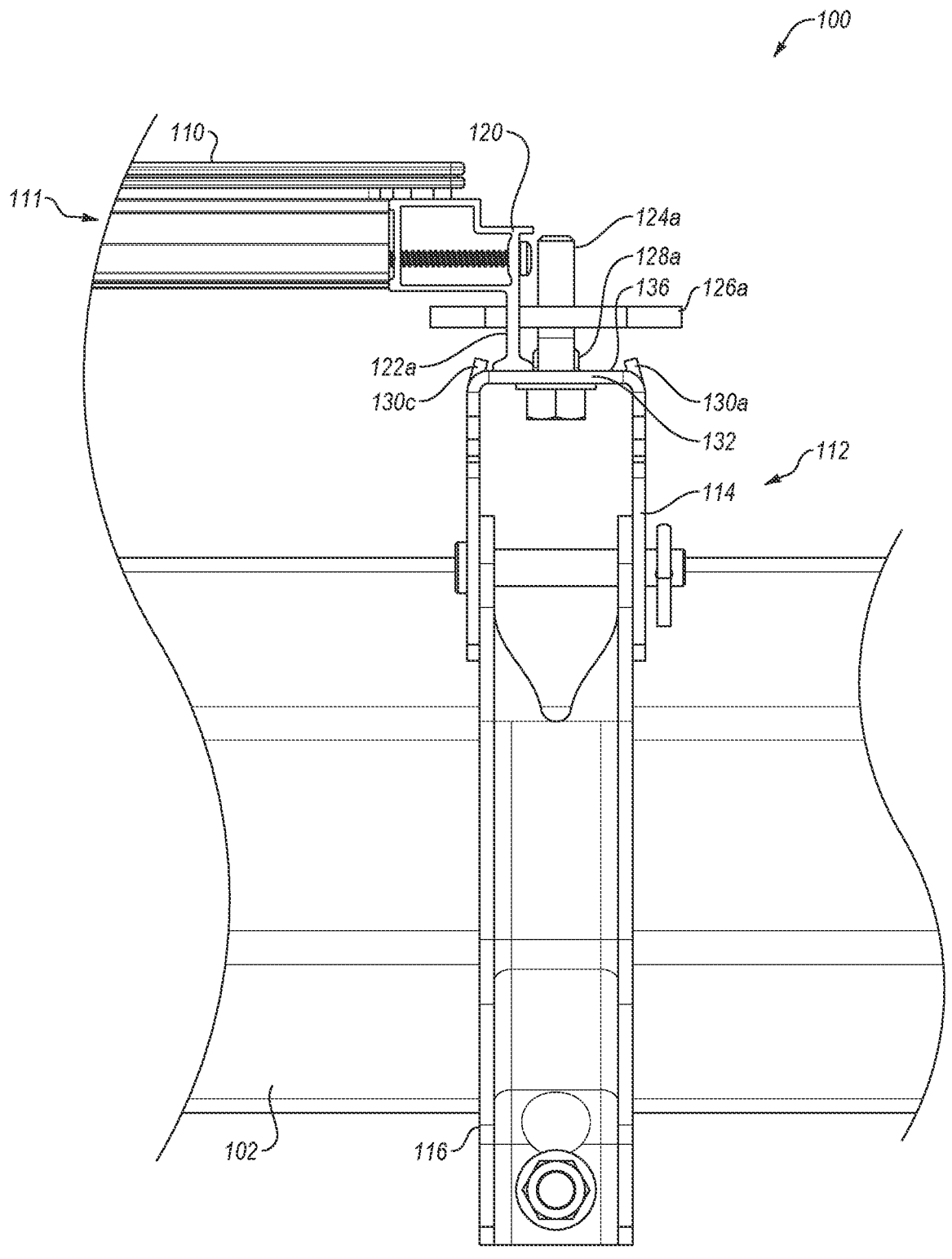
FIG. 1B illustrates a detail view of the example solar tracking system.

Referring to FIGS. 1A and 1B, an example of one type of system environment in which aspects of the present disclosure might be used is shown. Shown in FIGS. 1A and 1B is an embodiment of a solar tracking system 100. Although illustrated and described in relation to the solar tracking system 100, it is appreciated that the embodiments described in the present disclosure may be implemented in a solar tracking system, a fixed solar system, or any other appropriate solar system.

In the example shown, a PV module 111 is coupled to a torque tube 102 via a module mounting system 112 that includes a mounting rail 114 and a mounting clamp 116. A torque tube interface 109 operatively connects the torque tube 102 to a support column 106 via mounting brackets 108*a-b*. The torque tube interface 109 permits the torque tube 102 to rotate to generally orient a PV panel 110 of the PV module 111 towards the sun or normal to the east-west portion of the irradiance of the sun, which may facilitate increased electrical energy generation by the PV module 111.

During installation, the PV module 111 may be positioned such that a bottom surface (such as denoted 352 in FIG. 3) of a module rail 120 of the PV module 111 physically engages with a surface 136 of an upper portion 132 of the mounting rail 114. In addition, during installation, the PV module 111 may be aligned relative to the mounting rail 114. Bolts 124a-b may pass through bolt openings (such as denoted 242a-b in FIGS. 2A, 2C, and 2D) of the mounting rail 114 to interface with the clips 126a-b. Further, the clips 126a-b may interface with clip openings 122a-b of the module rail 120.

The bolts 124a-b may interface with the clips 126a-b to draw the module rail 120 towards the mounting rail 114 and couple the module rail 120 to the mounting rail 114. However, the clips 126a-b may rotate relative to the mounting rail 114, which may permit the PV module 111 to shift and be misaligned relative to the mounting rail 114. In addition, in some embodiments, the clips 126a-b may not prevent the module rail 120 from moving along a lateral axis (such as denoted 209 in FIGS. 2A, 2C, and 2D) of the mounting rail 114 and falling off the upper portion 132. In some embodiments, after the bolts 124a-b have interfaced with clips 126a-b to couple the module rail 120 and the mounting rail 114, the module rail 120 and the mounting rail 114 may be coupled together such that they move as a unitary body, such as when the torque tube 102 is rotated.

Figure 2A:
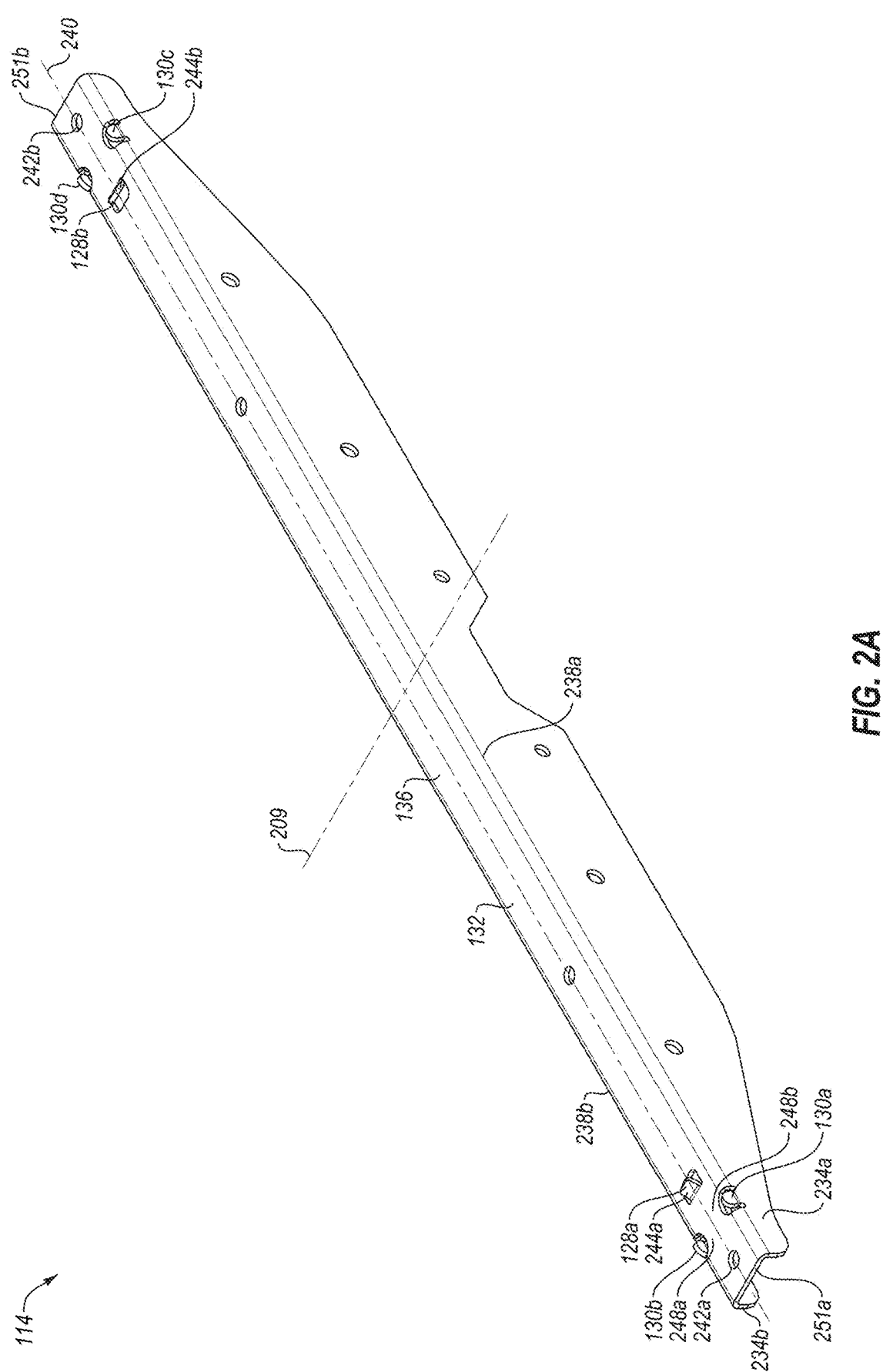
FIG. 2A illustrates a perspective view of one example of the mounting rails of FIGS. 1A and 1B.
Figure 2B:
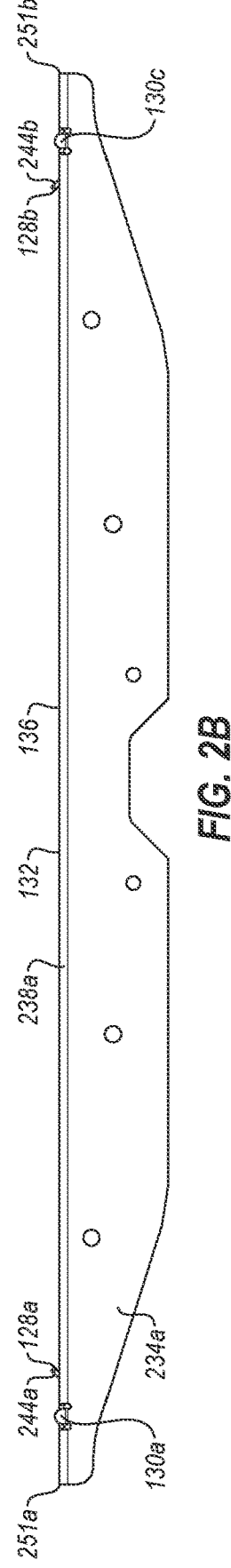
FIG. 2B illustrates a front view of the example of the mounting rails of FIGS. 1A and 1B.
Figure 2C:
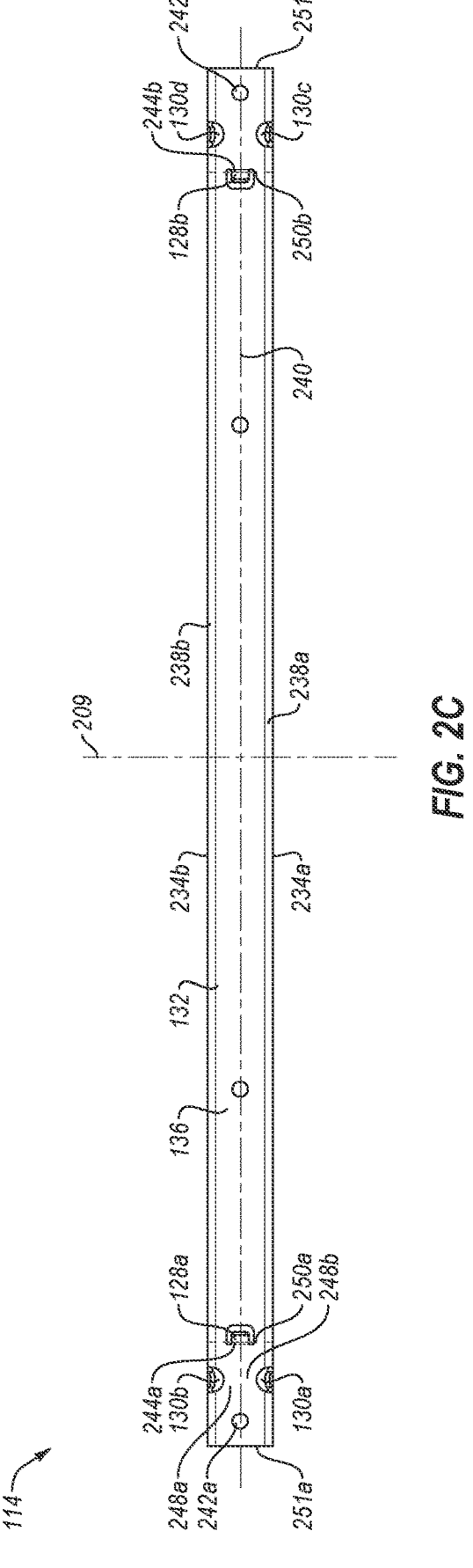
FIG. 2C illustrates a top view of the example of the mounting rails of FIGS. 1A and 1B.
Figure 2D:
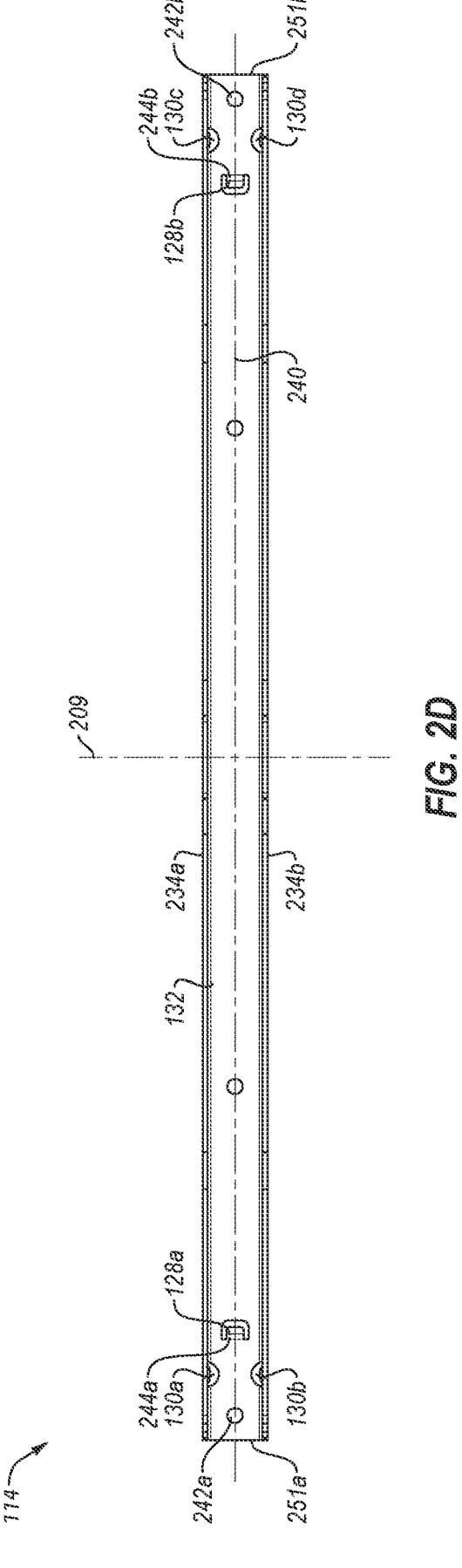
FIG. 2D illustrates a bottom view of the example of the mounting rails of FIGS. 1A and 1B.
Figure 2E:
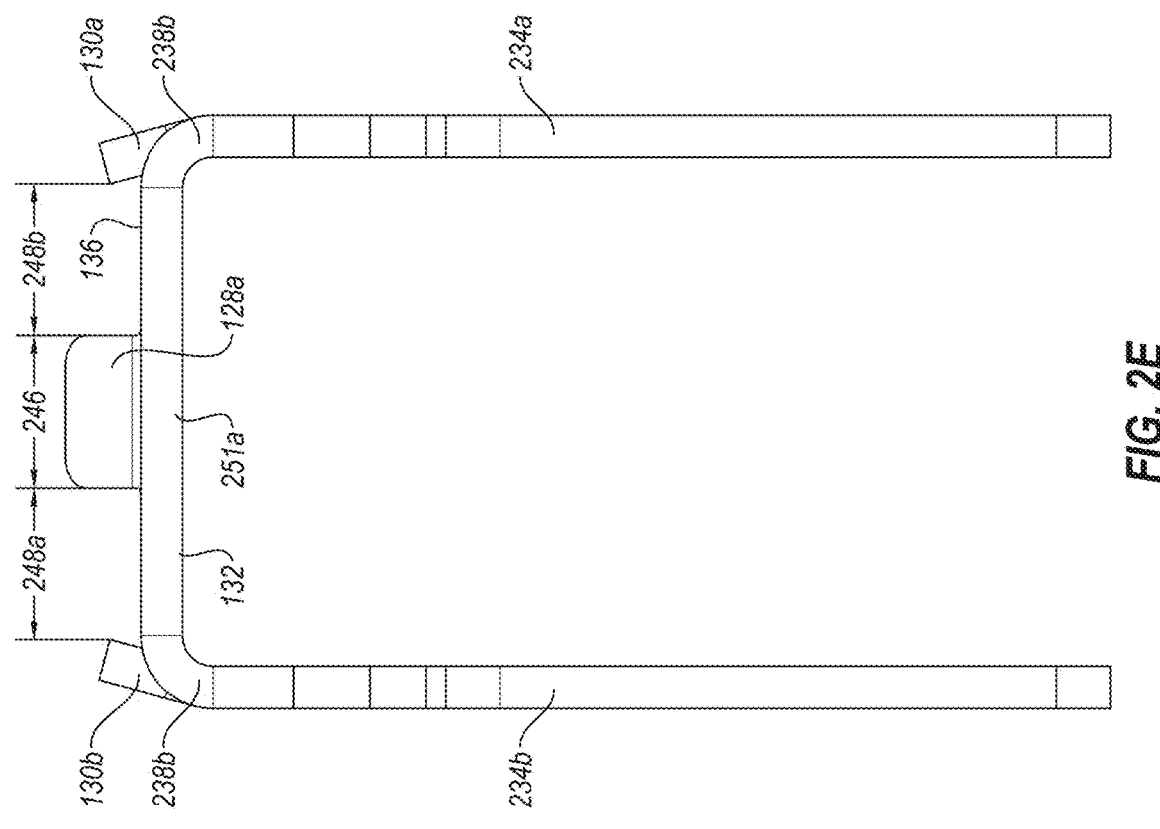
FIG. 2E illustrates a side view of the example of the mounting rails of FIGS. 1A and 1B.
Figure 3:
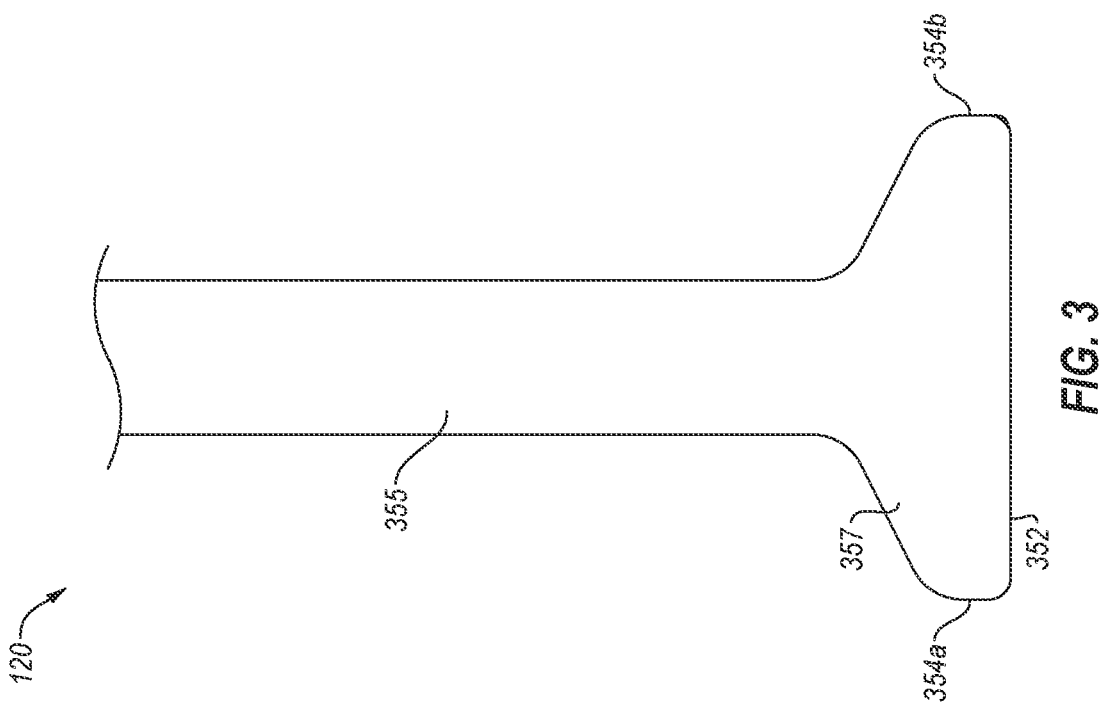
FIG. 3 illustrates a detail view of an example foot of the module rail of FIGS. 1A and 1B.

In a disclosed embodiment, alignment of the PV module 111 relative to the mounting rail 114 may be provided by way of one or more alignment members. One example of alignment members are shown in FIGS. 1A and 1B as alignment tabs that are denoted 128a-b. In addition, in disclosed embodiments, to prevent the PV module 111 from moving along the lateral axis 209 of the mounting rail 114 and falling off the upper portion 132, the mounting rail 114 may include one or more retention members. By way of example, retention members are shown here as retention tabs that are denoted 130a-d (130d is illustrated in FIGS. 2A, 2C, and 2D).

In an example configuration, alignment tabs 128a-b extend from the surface 136 of the upper portion 132 and are configured to physically engage with side surfaces (such as denoted 354a-b in FIG. 3) of the module rail 120 to align the PV module 111 relative to the upper portion 132. In addition, the exemplary alignment tabs 128a-b are sized to prevent the PV module 111 from contacting adjacent PV modules (not illustrated in FIGS. 1A and 1B). Further, in the example embodiment, the retention tabs 130a-d extend from edges of the upper portion 132 and are configured to physically engage with the side surfaces of the module rail 120 to prevent the module rail 120 from falling off the upper portion 132.

With further reference to FIGS. 1A and 1B and FIGS. 2A-2E, it is shown how in one example, the mounting rail 114 includes the upper portion 132 connected to lower portions 234a-b at edges 238a-b of the upper portion 132. The lower portions 234a-b extend from the edges 238a-b on planes that are generally perpendicular to a plane of the upper portion 132. Additionally, the lower portions 234a-b extend along planes that are generally parallel to each other. The upper portion 132 includes the surface 136 configured to physically engage with the bottom surface 352 of the module rail 120. In some embodiments, the upper portion 132 and the lower portions 234a-b may be manufactured of a single sheet of material.

The mounting rail 114 may include the exemplary alignment tabs 128a-b to align the PV module 111 relative to the mounting rail 114. Additionally or alternatively, the mounting rail 114 may include the exemplary retention tabs 130a-d to prevent the module rail 120 from falling off the surface 136 of the upper portion 132. The alignment tabs 128a-b and the retention tabs 130a-d may define boundaries of parts 248a-b of the upper portion 132 that are configured to physically engage with the bottom surface 352 of the module rail 120. For example, a first part 248a may include a longitudinal region along a length of the mounting rail 114 that is bounded on one side by the alignment tabs 128a-b and on the other side by the retention tabs 130b and 130d. As another example, a second part 248b may include a longitudinal region along a length of the mounting rail 114 that is bounded on one side by the alignment tabs 128a-b and on the other side by the retention tabs 130a and 130d.

The alignment tabs 128a-b may extend from the surface 136 of the upper portion 132 at locations 244a-b. For example, a first alignment tab 128a may extend from the surface 136 of the upper portion 132 at a first location 244a. As another example, a second alignment tab 128b may extend from the surface 136 of the upper portion 132 at a second location 244b. The locations 244a-b may be positioned one or more distances from ends 251a-b of the upper portion 132. Alternatively, the locations 244a-b may be positioned at the ends 215a-b of the upper portion 132. For example, the locations 244a-b may be positioned a distance equal to or less than one inch from the ends 251a-b of the upper portion 132. Alternatively, the locations 244a-b may be positioned a distance greater than one inch from the ends 251a-b of the upper portion 132. In some embodiments, the locations 244a-b may be centered relative to the edges 238a-b of the upper portion 132. In other embodiments, the locations 244a-b may be off center relative to the edges 238a-b of the upper portion 132.

In the example shown, the mounting rail 114 includes two exemplary alignment tabs 128a-b equally distanced from the ends 251a-b of the upper portion 132. However, the mounting rail 114 may include more or fewer alignment tabs that are equally or unequally positioned along the upper portion 132. For example, the mounting rail 114 may include one alignment tab, three alignment tabs, four alignment tabs, or more alignment tabs. As another example, the first alignment tab 128a may be positioned at a distance from the end 251a of the upper portion 132 that is equal to or less than the distance that the second alignment tab 128b is positioned from the end 251b of the upper portion 132. As yet another example, in an embodiment that includes three alignments tabs, two of the three alignment tabs may be equally distanced from the ends 251a-b of the upper portion 132 and another of the three alignment tabs may be centered on the upper portion 132.

The alignment tabs 128a-b may extend from the surface 136 of the upper portion 132 along a longitudinal axis 240 of the mounting rail 114. Longitudinal axes 250a-b (shown in FIG. 2C) of the alignment tabs 128a-b themselves may be perpendicular to the longitudinal axis 240 of the mounting rail 114. The alignment tabs 128a-b may extend from the surface 136 of the upper portion 132 on planes that are non-parallel to planes on which the retention tabs 130a-d extend along. Additionally or alternatively, the alignment tabs 128a-b may extend on planes that are non-parallel and non-perpendicular with a plane of the surface 136 of the upper portion 132.

The alignment tabs 128a-b may physically engage with the side surfaces 354a-b of the module rail 120. The alignment tabs 128a-b may be configured to physically engage with the side surfaces of multiple module rails. For example, the alignment tabs 128a-b may physically engage with the module rail 120 and an adjacent module rail. In some embodiments, the alignment tabs 128a-b may be configured to simultaneously physically engage with the side surfaces of multiple module rails.

The exemplary alignment tabs 128a-b may include widths 246 (shown in FIG. 2E) that are sized to prevent the PV module 111 from contacting other PV modules. In some embodiments the size of the widths 246 may be equal to or greater than five millimeters.

The retention tabs 130a-d may be positioned distances from the ends 251a-b of the upper portion 132. For example, the retention tabs 130a-d may be positioned at distances equal to or less than ¾ inch from the ends 251a-b of the upper portion 132. In some embodiments, the distances the retention tabs 130a-d are positioned from the ends 251a-b of the upper portion 132 may be equal to or less than the distance the locations 244a-b of the alignment tabs 128a-b are positioned from the ends 251a-b. In other embodiments, the distance the retention tabs 130a-d are positioned from the ends 251a-b of the upper portion 132 may be greater than the distance the locations 244a-b of the alignment tabs 128a-b are positioned from the ends 251a-b.

In the example shown, the mounting rail 114 includes four exemplary retention tabs 130a-d equally distanced from the ends 251a-b of the upper portion 132. However, the mounting rail 114 may include more or fewer retention tabs that are equally or unequally positioned along the edges 238a-b of the upper portion 132. For example, the mounting rail 114 may include one retention tab, two retention tabs, three retention tabs, five retention tabs, or more retention tabs. As another example, the retention tabs 130a-b may be positioned at a distance from the end 251a of the upper portion 132 that is equal to or less than the distance that the retention tabs 130c-d are positioned from the end 251b of the upper portion 132. As yet another example, in an embodiment that includes three retention tabs, two of the three retention tabs may be equally distanced from the ends 251a-b of the upper portion 132 along the first edge 238a of the upper portion 132 and another of the three retention tabs may be centered along the second edge 238b of the upper portion 132.

The retention tabs 130a-d may extend from the edges 238a-b of the upper portion 132. For example, the retention tabs 130a-b may extend from a first edge 238a of the upper portion 132 and the retention tabs 130c-d may extend from a second edge 238b of the upper portion 132. The retention tabs 130a-d may extend from the edges 238a-b in a direction that is generally opposite a direction that the lower portions 234a-b extend from the edges 238a-b.

The surface 136 of the upper portion 132 may include the bolt openings 242a-b configured to receive the bolts 124a-b. In some embodiments, the bolts 124a-b may traverse the bolt openings 242a-b to interface with the clips 126a-b and/or nuts (not illustrated) to couple the module rail 120 to the mounting rail 114. For example, the bolts 124a-b may traverse the bolt openings 242a-b and the clips 126a-b and/or nuts may thread onto ends of the bolts 124a-b.

In some embodiments, the bolt openings 242a-b may include threaded portions (not illustrated in FIGS. 2A-2E) configured to interface with threaded portions of the bolts 124a-b. The threaded portions of the bolts 124a-b and the bolt openings 242a-b may interface to prevent the bolts 124a-b from falling relative to the mounting rail 114. Additionally or alternatively, the bolt openings 242a-b may be without threaded portions. In some embodiments, the clips 126a-b may include threaded portions (not illustrated in FIGS. 1A and 1B) configured to interface with threaded portions of the bolts 124a-b. The threaded portions of the bolts 124a-b and the clips 126a-b may interface to prevent the bolts 124a-b from falling relative to the mounting rail 114. In other embodiments, the solar tracking system 100 may include nuts (not illustrated in FIGS. 1A and 1B) that interface with threaded portions of the bolts 124a-b to draw heads of the bolts 124a-b towards the mounting rail 114 and to prevent the bolts 124a-b from falling relative to the mounting rail 114.

In the example shown, the bolts 124a-b are positioned such that the heads of the bolts 124a-b physically engage with the mounting rail 114 on a surface opposite the surface 136 of the upper portion 132. However, an orientation of the bolts 124a-b may be reversed, and the heads of the bolts 124a-b may physically engage with the clips 126a-b.

The heads of the bolts 124a-b may be oversized compared to the bolt openings 224a-b to prevent the bolts 124a-b from passing through the bolt openings 224a-b. In addition, the heads of the bolts 124a-b may be oversized compared to the bolt openings 224a-b to prevent the bolts 124a-b from being pulled through the mounting rail 114. Further, the threaded portions of the bolts 124a-b and the threaded portion of the bolt openings 224a-b may interface to prevent the bolts 124a-b from falling relative to the mounting rail 114. Additionally or alternatively, the threaded portions of the bolts 124a-b and threaded portions of the clips 126a-b may interface to prevent the bolts 124a-b from falling relative to the mounting rail 114.

The bolt openings 242a-b may be positioned a distance from the ends 251a-b of the upper portion 132. For example, the bolt openings 242a-b may be positioned a distance equal to or greater than ¼ inch from the ends 251a-b of the upper portion 132. In some embodiments, the bolt openings 242a-b may be centered relative to the edges 238a-b of the upper portion 132. In other embodiments, the bolt openings 242a-b may be off center relative to the edges 238a-b of the upper portion 132.

With further reference to FIGS. 1A-3, an example leg 355 of the module rail 120 may include an example foot 357 that includes the bottom surface 352 that physically engages with the surface 136 of the upper portion 132 of the mounting rail 114. In addition, the foot 357 may include a first side surface 354a and a second side surface 354b that are configured to physically engage with the alignment tabs 128a-b and/or the retention tabs 130a-d of the mounting rail 114.

In some embodiments, a combination of the alignment tabs 128a-b and the retention tabs 130a-d may together interface with the side surfaces 354a-b of the module rail 120 such that the module rail 120 is kept in position. For example, if the bottom surface 352 physically engages with the first part 248a of the upper portion 132, the first side surface 354a physically engages with the retention tabs 130b and 130d and the second side surface 354b physically engages with the alignment tabs 128a-b. As another example, if the bottom surface 352 physically engages with the second part 248b of the upper portion 132, the first side surface 354a physically engages with the alignment tabs 128a-b and the second side surface 354b physically engages with the retention tabs 130a and 130c.

Figure 4:
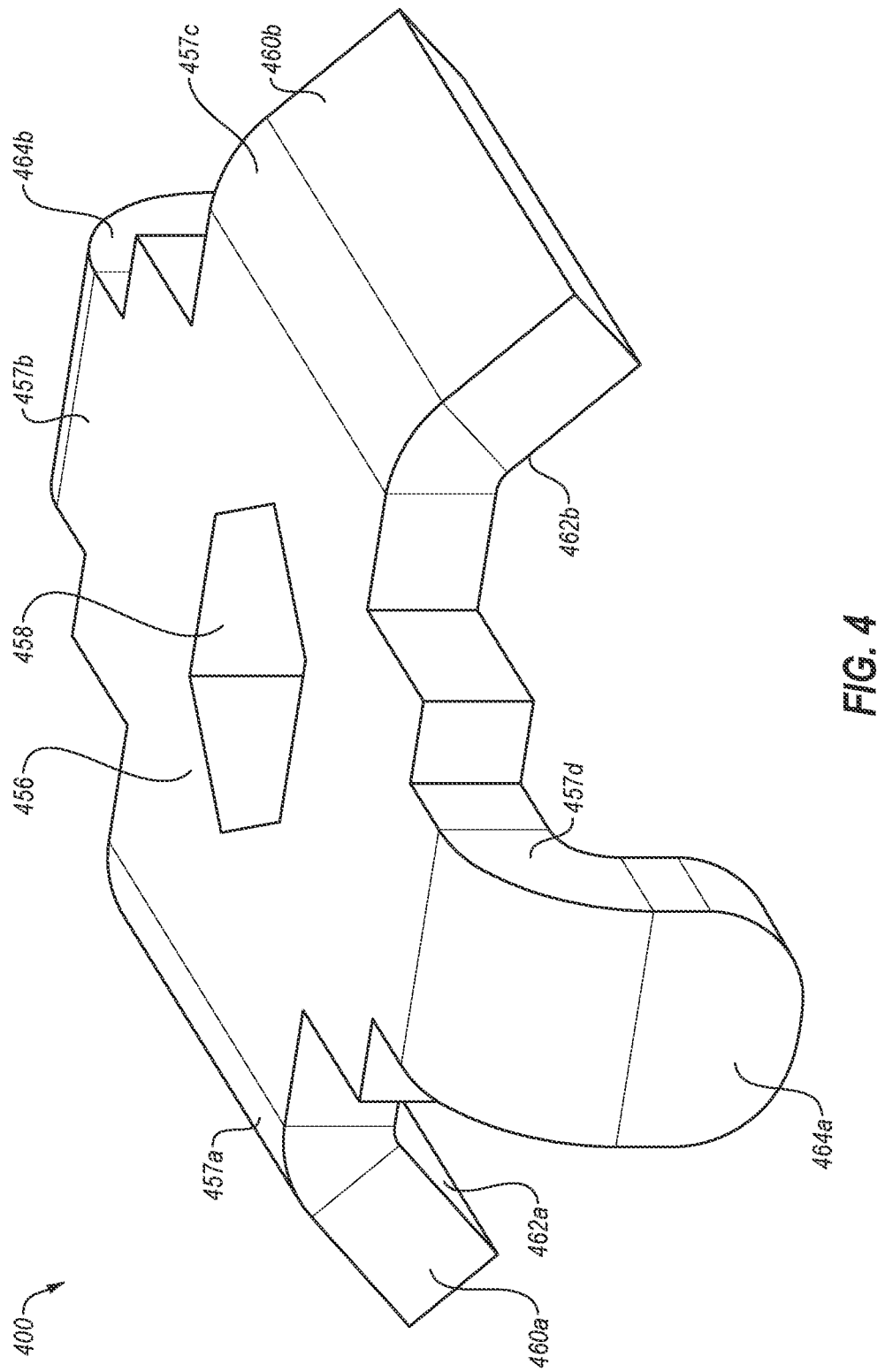
FIG. 4 illustrates an example clip, including retention wings and alignment wings.

With reference to FIG. 4, an example clip 400, including example retention wings 460a-b and example alignment wings 464a-b is shown. The clip 400 may be implemented in the solar tracking system 100 of FIGS. 1A and 1B in place of the clips 126a-b. In some embodiments, the example clip 400 may include a unibody piece of metal that is bent to form multiple joints 457a-d that connect the retention wings 460a-b and the alignment wings 464a-b to a center portion 456 of the clip 400. For example, a first joint 457a may connect a first retention wing 460a to the center portion 456 and a second joint 457b may connect a second alignment wing 464b to the center portion 456. In some embodiments, the clip 400 may be manufactured of a single piece of material such that the joints 457a-d may be bent portions of material.

The retention wings 460a-b and the alignment wings 464a-b may extend from the center portion 456 of the clip 400. For example, the retention wings 460a-b and the alignment wings 464a-b may extend from the center portion 456 at diagonal angles. The retention wings 460a-b and the alignment wings 464a-b extend from the center portion 456 of the clip 400 at generally perpendicular angles to each other. For example, the first retention wing 460a may extend from the center portion 456 at an angle that is generally ninety degrees offset from a first alignment wing 464a and the second alignment wing 464b.

Each of the joints 457a-d may include a radius of curvature. In some embodiments, the radius of curvature of each of the joints 457a-d may be the same. In other embodiments, the radius of curvature of each of the joints 457a-d may be different. Alternatively, the radius of curvature of one or more of the joints 457a-d may be different than one or more of the other joints 457a-d. In some embodiments, the radius of curvature of the joints 457a and 457c connecting the retention wings 460a-b may be less than the radius of curvature of the joints 457b and 457d connecting the alignment wings 464a-b.

The center portion 456 may include an opening 458 configured to receive a bolt (e.g., bolts 124a-b of FIGS. 1A and 1B). In the example shown, the opening 458 includes a hexagonal shape. However, the opening 458 may include different shapes. For example, the opening 458 may include a circular shape, a rectangular shape, a square shape, a pentagonal shape, or a triangular shape. In addition, the retention wings 460a-b may interface with the clip openings 122a-b. Further, the alignment wings 464a-d may physically engage with side surfaces of the module rail 120. The alignment wings 464a-b are sized to prevent the PV module 111 from contacting adjacent PV modules. In some embodiments, the size of the alignment wings 464a-b may be equal to or greater than five millimeters.

The opening 458 may receive the bolt and the retention wings 460a-b may interface with the clip openings 122a-b to prevent the module rail 120 from moving relative to the mounting rails 114 along the longitudinal axis 240 of the mounting rail 114. In addition, the opening 458 may receive the bolt and the alignment wings 464a-d may physically engage with the side surfaces of the module rail 120 to align the clip 400 relative to the upper portion 132.

The retention wings 460a-b may include wing surfaces 462a-b that are configured to physically engage with the module rail 120. For example, a first wing surface 462a may physically engage with a surface defining the first clip opening 122a or the second clip opening 122b. Alternatively, a second wing surface 462b may physically engage with the surface defining the first clip opening 122a or the second clip opening 122b. The wing surfaces 462a-b may physically engage with the module rail 120 to prevent the module rail 120 from falling off the upper portion 132.

In some embodiments, the angle at which the retention wings 460a-b are disposed may draw two adjacent PV modules towards each other as the clip 400 is tightened down. For example, the adjacent PV modules may be positioned next to each other on a mounting rail and the clip 400 may be positioned with the retention wings 460a-b within clip openings of the module rail 120 of the PV module 111. As a bolt passing through the clip 400 and through the mounting rail is tightened, the wing surfaces 462a-b may draw the two adjacent PV modules towards each other. The operation of the alignment wings 464a-b may retain spacing that prevents the two adjacent PV modules from contacting each other, while still being drawn closer together. By providing the wing surfaces 462a-b, the PV modules may be more securely locked into position relative to each other and the mounting rail, while still avoiding damage caused by contact between adjacent PV modules by operation of the alignment wings 464a-b.

In some embodiments, the clip 400 may be used in conjunction with the mounting rail 114 of FIGS. 1A and 1B or separately from the mounting rail 114. For example, the alignment wings 464a-b in conjunction with the alignment tabs 128a-b may prevent adjacent PV modules from contacting each other. As another example, the retention wings 460a-b in conjunction with retention tabs 130a-d may work cooperatively to prevent the PV modules from falling off the mounting rail 114.

Figure 5:
FIG. 5 illustrates a perspective view of an example mounting rail.

With reference to FIG. 5, an example mounting rail 500 is shown. The mounting rail 500 may be similar or comparable to the mounting rail 114 of FIGS. 1A-2E but may not include the alignment tabs 128a-b and/or some of the bolt holes.

The mounting rail 500 includes an upper portion 532 connected to lower portions 534a-b at edges 538a-b of the upper portion 532. The lower portions 534a-b extend from the edges 538a-b on planes that are generally perpendicular to a plane of the upper portion 532. Additionally, the lower portions 534a-b extend along planes that are generally parallel to each other. The upper portion 532 may include a surface 536 configured to physically engage with the bottom surface 352 of the module rail 120.

By way of example, retention members are shown here as retention tabs denoted at 530a-d. In the example embodiment, the retention tabs 530a-d prevent the module rail 120 from falling off the surface 536 of the upper portion 532. The retention tabs 530a-d may be positioned at ends 551a-b of the upper portion 532. In the example shown, the ends 551a-b extend beyond the lower portions 534a-b. The retention tabs 530a-d being positioned at the ends 551a-b may help manufacturing by permitting the retention tabs 530a-d to be formed without having to cut openings in the material of the mounting rail 500.

The retention tabs 530a-d may extend from the edges 538a-b of the upper portion 532. For example, the retention tabs 530a-b may extend from a first edge 538a of the upper portion 532 and the retention tabs 530c-d may extend from a second edge 538b of the upper portion 532. The retention tabs 530a-d may extend from the edges 538a-b in a direction that is opposite a direction that the lower portions 534a-b extend from the edges 538a-b.

The surface 536 of the upper portion 532 may include bolt openings 542a-b configured to receive the bolts 124a-b. In some embodiments, the bolts 124a-b may traverse the bolt openings 542a-b to interface with the clips 126a-b and/or nuts (not illustrated) to couple the module rail 120 to the mounting rail 500. For example, the bolts 124*a-b* may traverse the bolt openings 524*a-b* and the clips 126*a-b* and/or nuts may thread onto ends of the bolts 124*a-b*.

In some embodiments, the bolt openings 542*a-b* may include threaded portions (not illustrated in FIG. 5) configured to interface with threaded portions of the bolts 124*a-b*. The threaded portions of the bolts 124*a-b* and the bolt openings 542*a-b* may interface to prevent the bolts 124*a-b* from falling relative to the mounting rail 500. Additionally or alternatively, the bolt openings 542*a-b* may be without threaded portions.

The bolt openings 542*a-b* may be positioned a distance from the ends 551*a-b*. For example, the bolt openings 542*a-b* may be positioned a distance equal to or greater than ¼ inch from the ends 551*a-b*. In some embodiments, the bolt openings 542*a-b* may be centered relative to the edges 538*a-b* of the upper portion 532. In other embodiments, the bolt openings 542*a-b* may be off center relative to the edges 538*a-b* of the upper portion 532.

Figure 6:
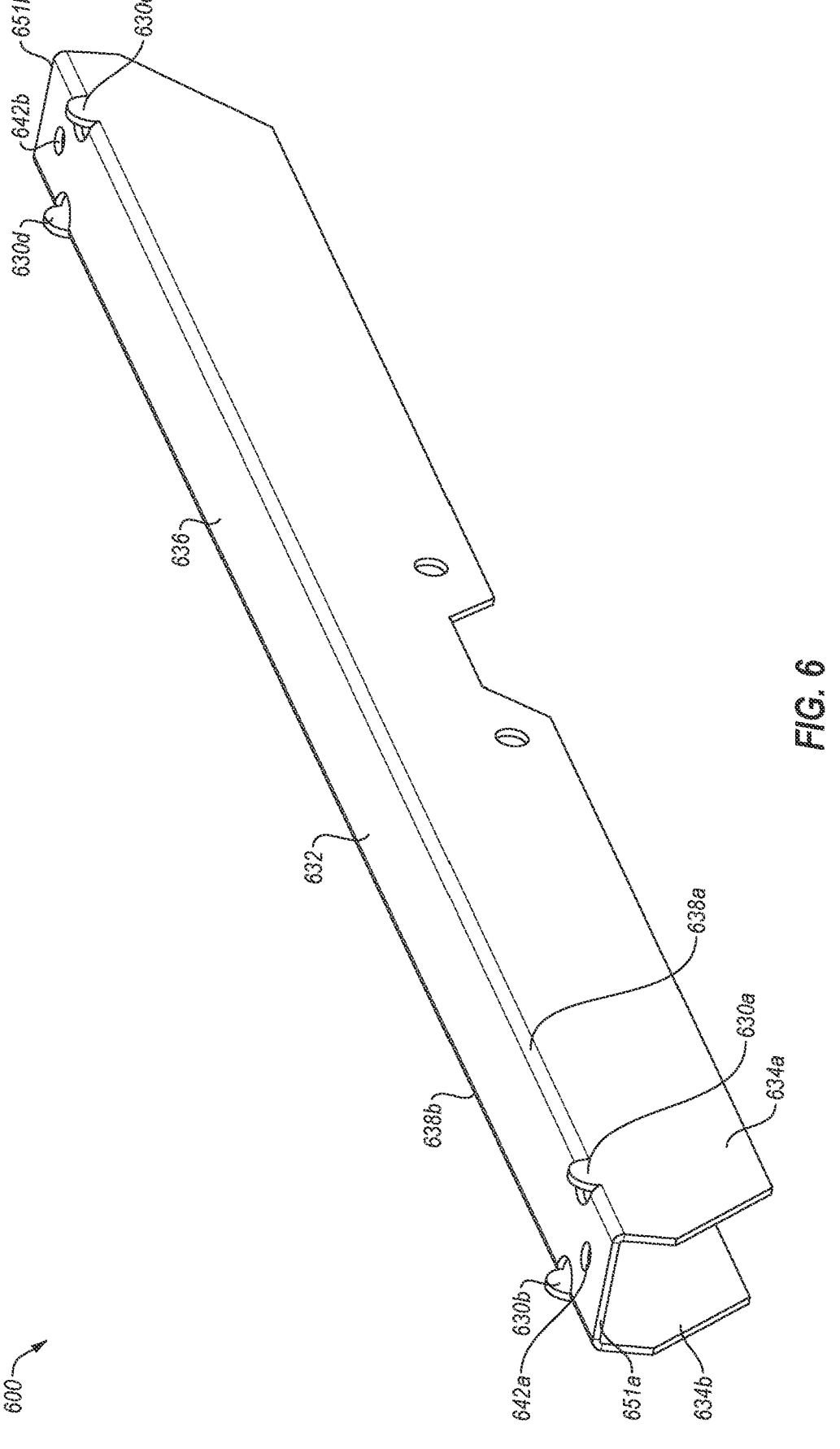
FIG. 6 illustrates a perspective view of another example mounting rail.

With reference to FIG. 6, another example mounting rail 600 is shown. The mounting rail 600 may be similar or comparable to the mounting rail 500 of FIG. 5, but retention tabs 630*a-d* may include a different profile compared to those of the mounting rail 500.

The mounting rail 600 includes an upper portion 632 connected to lower portions 634*a-b* at edges 638*a-b* of the upper portion 632. The lower portions 634*a-b* extend from the edges 638*a-b* on planes that are generally perpendicular to a plane of the upper portion 632. Additionally, the lower portions 634*a-b* may extend along planes that are generally parallel to each other. The upper portion 632 may include a surface 636 configured to physically engage with the bottom surface 352 of the module rail 120.

By way of example, retention members are shown here as retention tabs denoted at 630*a-d*. In the example embodiment, the retention tabs 630*a-d* prevent the module rail 120 from falling off the surface 636 of the upper portion 632. The retention tabs 630*a-d* may be positioned a distance from ends 651*a-b* of the upper portion 632. For example, the retention tabs 630*a-d* may be positioned a distance equal to or less than ¾ inch from the ends 651*a-b* of the upper portion 632. In the example shown, the ends 651*a-b* do not extend beyond the lower portions 634*a-b*.

The retention tabs 630*a-d* may extend from the edges 638*a-b* of the upper portion 632. For example, the retention tabs 630*a-b* may extend from a first edge 638*a* of the upper portion 632 and the retention tabs 630*c-d* may extend from a second edge 638*b* of the upper portion 632. The retention tabs 630*a-d* may extend from the edges 638*a-b* in a direction that is opposite a direction that the lower portions 634*a-b* extend from the edges 638*a-b*.

The surface 636 of the upper portion 632 may include bolt openings 642*a-b* configured to receive the bolts 124*a-b*. In some embodiments, the bolts 124*a-b* may traverse the bolt openings 642*a-b* to interface with the clips 126*a-b* and/or nuts (not illustrated) to couple the module rail 120 to the mounting rail 600. For example, the bolts 124*a-b* may traverse the bolt openings 624*a-b* and the clips 126*a-b* and/or nuts may thread onto ends of the bolts 124*a-b*.

In some embodiments, the bolt openings 642*a-b* may include threaded portions (not illustrated in FIG. 6) configured to interface with threaded portions of the bolts 124*a-b*. The threaded portions of the bolts 124*a-b* and the bolt openings 642*a-b* may interface to prevent the bolts 124*a-b* from falling relative to the mounting rail 600. Additionally or alternatively, the bolt openings 642*a-b* may be without threaded portions.

The bolt openings 642*a-b* may be positioned a distance from the ends 651*a-b*. For example, the bolt openings 642*a-b* may be positioned a distance equal to or greater than ¼ inch from the ends 651*a-b*. In some embodiments, the bolt openings 642*a-b* may be centered relative to the edges 638*a-b* of the upper portion 632. In other embodiments, the bolt openings 642*a-b* may be off center relative to the edges 638*a-b* of the upper portion 632.

Thus, the mounting rails 114, 500, and/or 600 and/or the clip 400 can simplify the installation process and increase the life span of the PV module 111 by aligning the PV module 111 relative to the mounting rail 114 without the need to manually align it. In addition, the mounting rails 114, 500, and/or 600 and/or the clip 400 can simplify the installation process by preventing the module rail 120 from falling off the surface 136, 536, and/or 636 of the upper portion 132, 532, and/or 632 of the mounting rails 114, 500, and/or 600.

What is claimed is:

1. A mounting rail configured to connect to a photovoltaic (PV) module, the mounting rail comprising:
    an upper portion comprising a surface configured to physically engage with a bottom surface of a module rail associated with the PV module;
    a first alignment member extending from the surface of the upper portion at a first location and configured to physically engage with a first side surface of the module rail;
    a second alignment member extending from the surface of the upper portion at a second location and configured to physically engage with the first side surface of the module rail; and
    a first retention member extending from an edge of the upper portion and configured to physically engage with a second side surface of the module rail opposite the first side surface.

2. The mounting rail of claim 1, wherein the first alignment member and the second alignment member are configured to align the PV module relative to the upper portion of the mounting rail.

3. The mounting rail of claim 1, wherein the first alignment member extends away from the upper portion on a plane that is non-parallel to a plane of the first retention member.

4. The mounting rail of claim 1, wherein the first location and the second location are positioned on a longitudinal axis of the mounting rail.

5. The mounting rail of claim 1, wherein the first alignment member and the second alignment member extend from the surface of the upper portion along a longitudinal axis of the mounting rail.

6. The mounting rail of claim 1, wherein a longitudinal axis of the first alignment member is perpendicular to a longitudinal axis of the mounting rail.

7. The mounting rail of claim 1, wherein a width of the first alignment member and a width of the second alignment member are sized to prevent the PV module from contacting an adjacent PV module.

8. The mounting rail of claim 1, further comprising
    a second retention member extending from the edge of the upper portion proximate the second location and configured to physically engage with the second side surface of the module rail, wherein the second retention member is configured to physically engage with the second side surface of the module rail.

9. The mounting rail of claim 8, wherein the first alignment member, the second alignment member, the first retention member, and the second retention member define boundaries of a part of the surface of the upper portion configured to receive the module rail.

10. The mounting rail of claim 1, wherein:

the module rail comprises a first module rail;

the first alignment member is configured to physically engage with a first side surface of a second module rail associated with a second PV module;

the second alignment member is configured to physically engage with the first side surface of the second module rail; and a width of the first alignment member and a width of the second alignment member are sized to prevent the PV module from contacting the second PV module.

11. The mounting rail of claim 10 further comprising:

a second retention member extending from the edge of the upper portion proximate the second location and configured to physically engage with the second side surface of the first module rail;

a third retention member extending from a second edge of the upper portion proximate the first location and configured to physically engage with a second side surface of the second module rail; and a fourth retention member extending from the second edge of the upper portion proximate the second location and configured to physically engage with the second side surface of the second module rail, wherein the third retention member and the fourth retention member are configured to physically engage with the second side surface of the second module rail.

12. A system comprising:

a torque tube;

a photovoltaic (PV) module comprising a module rail coupled to a PV panel; and a module mounting system coupling the module rail to the torque tube, the module mounting system comprising:

a mounting clamp coupled to the torque tube; and a mounting rail comprising:

an upper portion comprising a surface engaged with a bottom surface of the module rail;

a first alignment member extending from the surface of the upper portion at a first location and configured to physically engage with a first side surface of the module rail;

a second alignment member extending from the surface of the upper portion at a second location and configured to physically engage with the first side surface of the module rail; and a first retention member extending from an edge of the upper portion and configured to physically engage with a second side surface of the module rail opposite the first side surface.

13. The system of claim 12, wherein the upper portion includes a bolt opening, the system further comprising:

a bolt, the bolt opening being configured to receive the bolt; and a clip including an opening configured to receive the bolt, the clip configured to interface with a clip opening of the module rail to fix the module rail to the mounting rail such that the module rail and the mounting rail move as a unitary body.

14. The system of claim 13, wherein the clip comprises:

a center portion including the opening;

an alignment wing extending from the center portion, the alignment wing configured to physically engage with a third portion of the side surface of the module rail; and a retention wing extending diagonally away from the center portion at a perpendicular angle to the alignment wing, the retention wing comprising a wing surface configured to physically engage with the module rail to prevent the module rail from falling off the surface of the upper portion.

15. The system of claim 12, wherein a width of the first alignment member and a width of the second alignment member are sized to prevent the PV module from contacting an adjacent PV module.

16. The system of claim 12 comprising a second retention member extending from the edge of the upper portion proximate the second location and configured to physically engage with the second side surface of the module rail, wherein the second retention member is configured to physically engage with the second side surface of the module rail.

17. The system of claim 12, wherein:

the module rail comprises a first module rail;

the first alignment member is configured to physically engage with a first side surface of a second module rail associated with a second PV module;

the second alignment member is configured to physically engage with the first side surface of the second module rail; and a width of the first alignment member and a width of the second alignment member are sized to prevent the PV module from contacting the second PV module.

18. The system of claim 17 further comprising:

a second retention member extending from the edge of the upper portion proximate the second location and configured to physically engage with the second side surface of the first module rail;

a third retention member extending from a second edge of the upper portion proximate the first location and configured to physically engage with a second side surface of the second module rail; and a fourth retention member extending from the second edge of the upper portion proximate the second location and configured to physically engage with the second side surface of the second module rail, wherein the third retention member and the fourth retention member are configured to physically engage with the second side surface of the second module rail.

* * * * *